United States Patent
Uenohara et al.

[11] Patent Number: 5,857,548
[45] Date of Patent: Jan. 12, 1999

[54] CLUTCH ASSEMBLY HAVING A CLUTCH COVER ATTACHABLE TO A FLYWHEEL VIA AN INTERMEDIATE MEMBER TO PROVIDE RADIALLY REDUCED DIMENSIONS

[75] Inventors: Norihisa Uenohara, Ibaraki; Yoshinoru Fukuda, Hirashiosaka; Hiroshi Uehara, Hirakata, all of Japan

[73] Assignee: EXEDY Corporation, Neyagawa, Japan

[21] Appl. No.: 815,170

[22] Filed: Mar. 11, 1997

[30] Foreign Application Priority Data

Mar. 19, 1996 [JP] Japan ................................. 8-062582
Mar. 19, 1996 [JP] Japan ................................. 8-062583

[51] Int. Cl.⁶ .............................. F16D 13/32; F16D 13/58
[52] U.S. Cl. .................................. 192/70.17; 192/70.27; 192/89.23
[58] Field of Search ........................... 192/70.13, 70.17, 192/70.27, 89.23, 89.24

[56] References Cited

U.S. PATENT DOCUMENTS

| 4,646,892 | 3/1987 | Takeuchi et al. | 192/70.27 |
| 4,655,333 | 4/1987 | Martinez-Corral | 192/70.27 |
| 4,811,826 | 3/1989 | Kittel et al. | 192/70.13 |
| 5,392,888 | 2/1995 | Kajitani et al. | |
| 5,476,166 | 12/1995 | Schierling et al. | 192/70.17 X |
| 5,490,586 | 2/1996 | Junot et al. | |
| 5,680,918 | 10/1997 | Reik et al. | 192/70.13 X |
| 5,711,406 | 1/1998 | Lindner et al. | 192/70.17 |

FOREIGN PATENT DOCUMENTS

| 44 15 482 | 5/1993 | Germany . |
| 43 09 570 | 9/1993 | Germany . |
| 2 248 476 | 4/1992 | United Kingdom . |
| 2 276 682 | 10/1994 | United Kingdom . |

*Primary Examiner*—Rodney H. Bonck
*Attorney, Agent, or Firm*—Shinjyu An Intellectual Property Firm

[57] ABSTRACT

A clutch assembly (1) in a first embodiment is provided with a flywheel (7), a clutch cover (42), arcuate engagement plates (40) and wire members (44). Each arcuate engagement plate (40) includes an engagement portion fixed to an outer circumferential portion of the flywheel (7) and extending in a direction away from an engine and a bent portion (40b) further extending in a axial direction from an end of the engagement portion and bent radially inwardly. The clutch cover (42) has a hole (42b) into which the bent portion (40b) is inserted without any gap in the circumferential direction and is in contact with an end of the engagement portion of an arcuate projecting plate (40). The wire members (44) are detachably disposed between the ends of the bent portions (40b) and the clutch cover (42). The wire members (44) prevent the clutch cover (42) from moving toward the bent portions (40b). In a second embodiment, a clutch assembly (101), arcuate engagement plates (140) are fixed to an outer circumferential portion of the flywheel (7). An outer circumferential portion of the clutch cover (142) is engaged in a non-rotatable manner with the arcuate engagement plate (140) and detachably in a direction away from the flywheel (7). Bolts (144) limit the axial movement of the clutch cover (142) away from the arcuate engagement plates (140).

11 Claims, 4 Drawing Sheets

CLUTCH ASSEMBLY HAVING A CLUTCH COVER ATTACHABLE TO A FLYWHEEL VIA AN INTERMEDIATE MEMBER TO PROVIDE RADIALLY REDUCED DIMENSIONS

BACKGROUND OF THE INVENTION

1. Field of the Invention

The present invention relates to a clutch assembly, and more particular to a clutch assembly in which a flywheel and a clutch cover assembly are fixed to each other by an intermediate piece to provide a reduction in radial size.

2. Description of the Related Art

A clutch assembly is mainly composed of a flywheel on an input side, a clutch cover subassembly fixed to this flywheel and a clutch disc subassembly. The clutch cover assembly is mainly composed of a dish-like clutch cover, a pressure plate covered by the clutch cover and facing the flywheel, and a diaphragm spring for urging the pressure plate, supported to the clutch cover, toward the flywheel. A bolt mounting seat projecting radially outwardly is formed on an outer circumferential portion of the flywheel. An outer circumferential portion of the clutch cover is fastened to the bolt mounting seat by bolts. The clutch disc subassembly is interposed between the flywheel and the pressure plate. When the release unit causes the diaphragm spring to move in the axial direction, a spring force against the pressure plate is released so that the pressure plate is separated away from the clutch disc subassembly.

There is a clutch assembly in which the bolt mounting seat of the flywheel is dispensed with, and the outer circumferential portion of the clutch cover is press-fitted to and integrated with the outer circumferential portion of the flywheel. Thus, the bolt mounting seat is dispensed with so that the clutch assembly as a whole is miniaturized in the radial direction.

In the conventional clutch assembly, when a worn clutch disc subassembly is replaced by new one, the clutch as a whole is removed from the crankshaft. Subsequently, the press-fitted portion of the clutch cover is broken to disassembly the clutch disc subassembly and the flywheel from each other. In this case, the clutch cover that has been removed could not be reused.

In order to solve such a problem, Japanese Utility Model Application Laid-Open No. Hei 5-81532 discloses a clutch assembly in which the outer circumferential portion of the clutch cover is engaged with the outer circumferential portion of the flywheel with the two components being kept non-rotatable relative to each other. Furthermore, the two components are fastened by bolts. In this clutch assembly, since bolts are mounted from the outer circumferential side of the flywheel, the radial dimension of the clutch assembly as a whole is increased and at the same time, the operation for the bolts becomes difficult.

SUMMARY OF THE INVENTION

An object of the present invention is to provide a clutch assembly in which a clutch cover and a flywheel may be detachably fixed, in the absence of a bolt mounting seat, to thereby enhance operability in replacing clutch disc subassemblies and to reduce the axial dimensions thereof.

In accordance with one aspect of the present invention, a clutch assembly includes a flywheel having a friction surface formed thereon, an engagement member engaged with an outer circumferential surface of the flywheel, the engagement member formed with at least one engagement portion extending in an axial direction away from the flywheel, the engagement portion formed at a distal end thereof with a bent portion which extends radially inwardly. A disc-like clutch cover is formed at an outer circumferential portion thereof with at least one hole through which the bent portion extends. A pressure plate and diaphragm spring are disposed within the disc-like clutch cover, the pressure plate formed with a friction surface confronting the friction surface of the flywheel and the diaphragm spring biasing the pressure plate toward engagement with the friction surface of the flywheel. A limiting member is disposed detachably between the bent portion and an outer surface of the disc-like clutch cover restraining the disc-like clutch cover from axial movement with respect to the engagement member. Further, a clutch disc is disposed between the friction surface of the flywheel and the friction surface of the pressure plate.

Preferably, the engagement member includes a plurality of arcuate members which together circumferentially encompass the flywheel, each of the arcuate members formed with at least one engagement portion, each engagement portion formed with the bent portion, and the disc-like clutch cover is formed with a plurality of the holes, each one of the holes corresponding to one of the bent portions. Further, the limiting member comprises at least one arcuate shaped wire member disposed between ends of adjacent ones of the bent portions and the disc-like clutch cover.

Preferably, the wire member is bent at each end thereof for engagement with a portion of a corresponding one of the bent portion.

Preferably, the disc-like clutch cover is formed with an outer circumferential edge which is bent to extend in an axial direction for engagement with an outer circumferential surface of the engagement portion.

Preferably, the flywheel is connected to a driven member which extends into a vibration damper mechanism, the vibration damper mechanism being configured to receive torque.

Preferably, the clutch assembly further includes an annular inertia member fixed to the vibration damper mechanism for rotation therewith, the annular inertia member circumferentially surrounding the flywheel and the engagement member, the vibration damper mechanism configured to allow limited rotary displacement between the flywheel and the annular inertia member.

In accordance with another aspect of the invention, a clutch assembly includes a flywheel having a friction surface formed thereon and an engagement member engaged with an outer circumferential surface of the flywheel, the engagement member extending in an axial direction away from the flywheel, the engagement member formed with engagement portions formed at a distal end thereof. A disc-like clutch cover is formed at an outer circumferential portion thereof with a plurality of engaging extensions which extend radially outwardly from the disc-like clutch cover for engagement with the engagement portions. A pressure plate and diaphragm spring are disposed within the disc-like clutch cover, the pressure plate formed with a friction surface confronting the friction surface of the flywheel and the diaphragm spring biasing the pressure plate toward engagement with the friction surface of the flywheel. A retaining member connecting the disc-like clutch cover to the engagement portion. A clutch disc is disposed between the friction surface of the flywheel and the friction surface of the pressure plate.

Preferably, the engagement portions are formed with a plurality of apertures and the retaining member comprises a plurality of retaining members, each one of the retaining members extending through a corresponding one of the apertures, and a portion of each of the retaining members is bolted to the clutch cover.

Preferably, the engagement portions include a plurality of alternating convex and concave portions formed on the engagement member, configured to engage the engaging extensions.

Preferably, the engagement member is formed with a corrugated portion at an outer end thereof, and the disc-like clutch cover is formed at an outer edge thereof with a corresponding a corrugated portion configured to engage the corrugated portion of the engagement member.

Preferably, the flywheel is connected to a driven member which extends into a vibration damper mechanism, the vibration damper mechanism being configured to receive torque.

Preferably, the clutch assembly further includes an annular inertia member fixed to the vibration damper mechanism for rotation therewith, the annular inertia member circumferentially surrounding the flywheel and the engagement member, the vibration damper mechanism configured to allow limited rotary displacement between the flywheel and the annular inertia member.

In the present invention, when the clutch disc subassembly is replaced, the limiting member is removed from the end of the bent portion and the disc-like clutch cover. Subsequently, the disc-like clutch cover is removed from the flywheel to thereby release the engagement with the engagement member. In this case, the pressure plate and the biasing member are together detached so that the clutch disc subassembly may be removed. As described herein, when the disc-like clutch cover is removed, there is little likelihood of damage. For this reason, it is possible to reuse the disc-like clutch cover that has been removed. Furthermore, since the bolt mounting seat of the flywheel is dispensed with, the flywheel is made small in size in the radial direction. With such an arrangement, only by mounting and dismounting the limiting member between the bent portion ends and the disc-like clutch cover, the fastening and dismounting of the disc-like clutch cover may be performed. It is therefore possible to dispense with the bolts or the like to thereby reduce the cost. Also, all the operation may be performed from the transmission side to thereby enhance the operability.

These and other objects, features, aspects and advantages of the present invention will become more fully apparent from the following detailed description of the present invention when taken in conjunction with the accompanying drawings where like reference numerals denote corresponding parts throughout.

DESCRIPTION OF THE PREFERRED EMBODIMENTS

A first embodiment of the present invention will now be described with reference to FIGS. 1 and 2 of the accompanying drawings.

Figure 1:
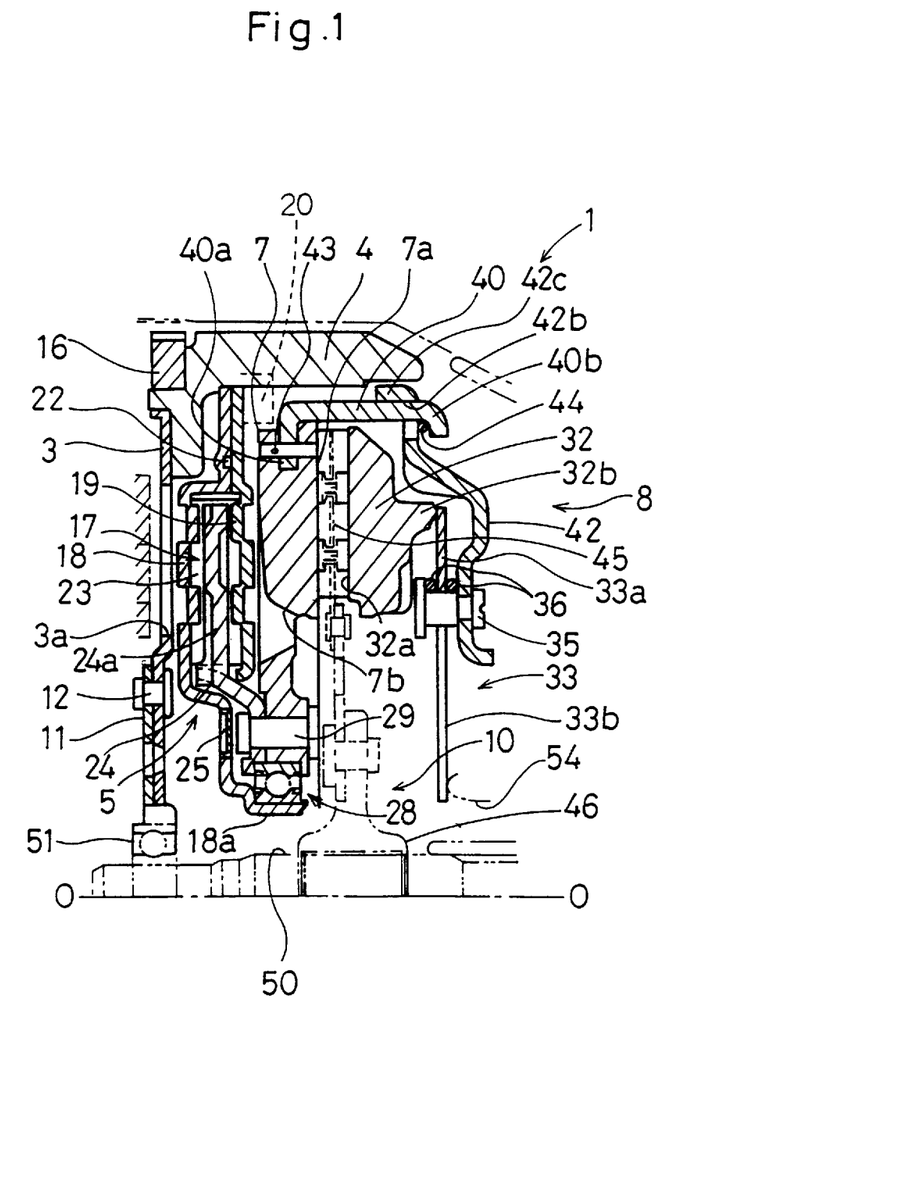
FIG. 1 is a fragmentary schematic cross-sectional view showing a clutch assembly in accordance with a first embodiment of the present invention.
Figure 2:
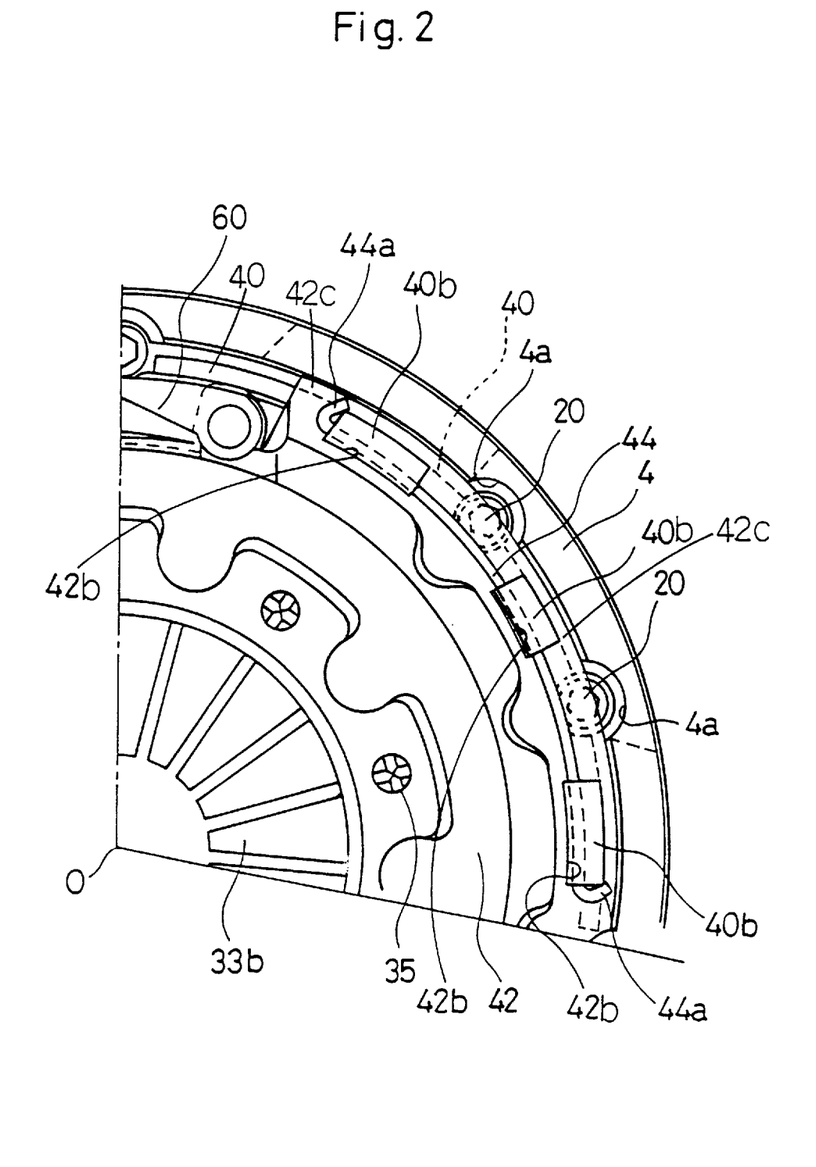
FIG. 2 is a fragmentary elevational view of the clutch assembly shown in FIG. 1.

A clutch assembly 1 shown in FIGS. 1 and 2 in accordance with one embodiment of the invention is mainly composed of a flexible plate 3, an inertia member 4, a viscous damper mechanism 5, a flywheel 7, a clutch cover subassembly 8, and a clutch disc subassembly 10. An engine (not shown) is disposed on the left side of FIG. 1, and a transmission (not shown) is disposed on the right side of FIG. 1. Hereinafter, the left side of FIG. 1 will be referred to as the engine side and the right side of FIG. 1 will be referred to as the transmission side.

The flexible plate 3 is a disc-like plate member. A disc-like plate member 11 is fixed to an inner circumferential portion of the flexible plate 3 by rivets 12. The inner circumferential portion of the flexible plate 3 is fixed to a crankshaft (not shown) on the engine side together with the plate member 11. A plurality of circular holes 3a formed at equal circumferential intervals are provided in a radially intermediate portion of the flexible plate 3. The flexible plate 3 is highly rigid in the circumferential direction but flexible in bending directions.

The inertia member 4 is fixed to an outer circumferential edge of the flexible plate 3 by rivets (not shown). The inertia member 4 is a cylindrical member that is elongated in the axial direction. A ring gear 16 is fixed to the inertia member 4.

The viscous damper mechanism 5 is mainly composed of a first input plate 18, a second input plate 19, a pair of elongated, undulated leaf springs 23, and a driven member 24. The undulated leaf spring 23, input plates 18 and 19 are of a type similar to those described in detail in co-pending U.S. application entitled "FLYWHEEL ASSEMBLY EMPLOYING A DAMPER MECHANISM HAVING AN ANNULAR CHAMBER FILLED WITH A DRY LUBRICANT", serial number 08,804,261 and filed Feb. 21, 1997, claiming priority to Japanese patent application numbers JP 8-043526, filed Feb. 29, 1996, JP 8-121857 filed May 16, 1996 and JP 8-164664 filed Jun. 25, 1996, which are all incorporated herein by reference. The first input plate 18 is a disc-like plate member disposed on the side of the flexible plate 3. An outer circumferential portion of the first input plate 18 is in contact with an inner circumferential surface of the inertia member 4. Also, an inner circumferential portion of the first input plate 18 has an inner projecting portion 18a extending toward the transmission side. A radially intermediate portion of the first input plate 18 has a convex portion projecting on the engine side. The second input plate 19 is a disc-like plate member disposed on the side of the first input plate 18. An outer circumferential edge of the second plate 19 is in contact with the inner circumferential surface of the inertia member 4. Also, the outer circumferential portion of the first input plate 18 and the outer circumferential portion of the second input plate 19 are in contact with each other and are fixed to each other by rivets (not shown). A seal ring 22 is disposed between the two outer circumferential portions.

Furthermore, the outer circumferential portions of the first and second input plates 18 and 19 are fastened to the inertia member 4 by a plurality of bolts 20. The bolts 20 are fastened from the transmission side. Also, recesses 4a (FIG. 2) are formed in the inertia member 4 corresponding to the respective bolts 20.

A generally annular space defined between the radial mid-portions of the first input plate 18 and the second input plate 19 is a spring receiving chamber 17. The pair of undulated leaf springs 23 are disposed within the spring receiving chamber 17. Each of the undulated leaf springs 23 is shaped to extend in an arcuate form. The undulated leaf springs 23 have a plurality of viscous fluid filled spaces within them and the walls of the spring receiving chamber 17.

The driven member 24 is a disc-like member extending in the spring receiving chamber 17 and has engagement portions 24 in contact with both ends of the pair of undulated leaf springs 23 in the circumferential direction. Also, the first and second input plates 18 and 19 have drawn worked portions that are bent in the axial direction and are brought into contact with both ends, in the circumferential direction, of the undulated leaf springs 23 in a manner similar to that described in greater detail in co-pending U.S. application entitled "FLYWHEEL ASSEMBLY EMPLOYING A DAMPER MECHANISM HAVING AN ANNULAR CHAMBER FILLED WITH A DRY LUBRICANT", serial number 08/804,261 and filed Feb. 21,1997.

The flywheel 7 has an annular friction surface 7a on the transmission side. Communication holes 7b are formed in the flywheel 7 that allow air flow between the opposing surfaces of the flywheel 7. The driven member 24 is fastened to the inner circumferential edge of the flywheel 7 by rivets 29. The inner circumferential portions of the flywheel 7 and the driven member 24 are supported on an inner circumferential projecting portion 18a of the first input plate 18 through a bearing 28.

The clutch cover subassembly 8 includes a plurality of arcuate engagement plates 40 (in the present embodiment there are three plates 40 although only one is shown), a receiving member 41, a clutch cover 42, a pressure plate 32, wire members 44, stud pins 35, two wire rings 36 and a diaphragm spring 33.

Each arcuate engagement plate 40 (engagement member) is a plate member that extends from the flywheel 7 toward the transmission and extends in the circumferential direction as is apparent from FIG. 2. There are three (3) arcuate engagement plates 40 provided at the outer circumference of the flywheel 7 at equally spaced apart intervals in the circumferential direction. Each arcuate engagement plate 40 has, at the engine side end, an engagement portion 40a inserted into a groove formed in the outer circumferential surface of the flywheel 7. The engagement portion 40a is fixed to the flywheel 7 by a pin 43. Three bent portions 40b are formed at front ends of each arcuate engagement plate 40. Each bent portion 40b slightly extends from the front end of the plate body in the axial direction and further curves radially inwardly. As is apparent from FIG. 2, the middle bent portion 40b is shorter in the circumferential direction than the bent portion 40b on either sides.

The clutch cover 42 is a disc-like plate member having a larger diameter central hole in the center. The clutch cover 42 is formed with holes 42b, each hole 42b at a position corresponding to the respective bent portions 40b. Namely, when the clutch assembly 1 is fully assembled, the bent portions 40b of each arcuate engagement plate 40 extend through a corresponding one of the holes 42b with no gaps in the circumferential direction. As a result, the bent portions 40b are exposed to the transmission side of the clutch cover 42. An outer circumferential portion of the clutch cover 42 is in contact with the transmission side of the arcuate engagement plate 40 at portions extending between the various bent portions 40b. The clutch cover 42 also has an outer circumferential bent portion 42c in contact with the outer circumferential surface of the arcuate engagement plate 40.

Each wire member 44 extends in an arcuate shape and is located between the bent portion 40b and the clutch cover 42 in the axial direction. As a result, the clutch cover 42 is unmovable in the axial direction relative to the arcuate engagement plates 40. Bent engagement portions 44a are formed at either end of the wire member 44. The bent engagement portions 44a engage corresponding bent portions 40b. Thus, the wire member 44 is not easily removed away from the bent portions 40b.

The pressure plate 32 is an annular member disposed on the inner circumferential side of the arcuate engagement plates 40. A pressure surface 32a facing the friction surface 7a of the flywheel 7 is formed in the pressure plate 32. Also, an annular projecting portion 32b projecting on the transmission side is formed on a surface opposite the pressure surface 32a of the pressure plate 32. The pressure plate 32 is fixed non-rotatable relative to the clutch cover 42 by a strap plate 60 extending in a tangential direction between the adjacent engagement plates 40 in the circumferential direction. Also, the pressure plate 32 is biased in a direction away from the flywheel 7 by the strap plate 60.

The diaphragm spring 33 is a disc-like member disposed between the pressure plate 32 and the clutch cover 42 and composed of an annular resilient member 33a and a plurality of lever portions 33b extending inwardly from the resilient portion 33a. The resilient portion 33a is supported at both side surfaces on the inner circumferential side by the wire ring 36, and are contacted at its outer circumferential portion with the annular projecting portion 32b of the pressure plate 32.

A plurality of stud pins 35 fixed to the inner circumferential portion of the clutch cover 42 extend toward the pressure plate 32 through apertures formed in the diaphragm spring 33. The two wire rings 36 supported by the stud pins 35 support the diaphragm spring 33.

The clutch disc subassembly 10 has a friction facing 45 interposed between the frictional surface 7a of the flywheel 7 and the pressure surface 32a of the pressure plate 32. The friction facing 45 is fixed to a hub 46 through a plate member. A main drive shaft 50 extending from the transmission side is spline-engaged with the hub 46. Also, the tip end of the main drive shaft 50 is rotatably supported to the crankshaft (not shown) through a bearing 51. A release unit 54 is in contact with the tip end of each lever portion 33b of the diaphragm spring 33 from the transmission side.

The operation of the clutch assembly 1 will now be described.

When the crankshaft on the engine side is rotated, the torque is transmitted through the flexible plate 3 and the viscous damper mechanism 5 to the flywheel 7, further transmitted to the clutch disc subassembly 10 in the clutch engagement condition, and finally outputted from the main drive shaft 50.

In the case where the bent vibration is transmitted from the engine side, the flexible plate 3 may absorb the bending vibration while being warped in the bent direction.

In the case where the twist vibration is transmitted from the engine side, the first and second input plates 18 and 19 and the flywheel 7 take periodical relative rotation. In this case, the undulated leaf springs 23 are compressed in the circumferential direction, and the viscous fluid filled spaces between the undulated leaf springs 23 and the first and second input plates 18 and 19 within the spring receiving chamber 17 are reduced. As a result, the viscous resistance is generated to thereby attenuate the twist vibration.

Since the inertia member 4 is disposed outer circumferential portion, it is possible to reduce a thickness in the axial direction of the structure of the first and second input plates 18 and 19 that constitute the spring receiving chamber 17. As a result, the clutch assembly as a whole may be made small in size in the axial direction. Furthermore, since the inertia member 4 extends longitudinally in the axial direction, it is not necessary to include an outer radial portion of the clutch assembly 1 to provide mass, therefore the radial dimensions may be reduced. Thus, with the inertia member 4 provided on the outer circumferential portion of the viscous damper mechanism 5, the assembly is reduced in size in the radial direction. Further, it is not necessary to provide a bolt mounting seat on an outer radial portion of the flywheel 7 and therefore, the inertia member 4 may be disposed more radially inwardly.

In this clutch assembly 1, it is possible to replace the clutch disc subassembly 10 while leaving the flywheel 7 and the viscous damper mechanism 5 mounted on the inertia member 4. When the clutch cover 8 is to be removed, the clutch cover 42 and the pressure plate 32 are fastened to one another in the axial direction by a technician using temporary fastening bolts (not shown). By the temporary bolts, the clutch cover 42 and the pressure plate 32 may be brought closer to each other counteracting the load from the diaphragm spring 33. Under this condition, the bent engagement portions 44a of each wire member 44 is deformed and each of the wire members 44 may be removed from between the bent portions 40b and the clutch cover 42. Then, the clutch cover subassembly 8 is drawn toward the transmission side. In this case, in order not to interfere with the pressure plate 32, it is necessary to slightly elastically deform the arcuate engagement plates 40 radially outwardly. The clutch disc subassembly 10 may then be removed.

The operation to mount the clutch cover subassembly 8 is carried out in the opposite steps to the above-explained case. First of all, a new clutch disc subassembly 10 is inserted. Subsequently, the clutch cover subassembly 8 composed of the pressure plate 32 and the clutch cover 42 which are fixed to each other by the above-described temporary fastening bolts is inserted from the transmission side. Then, the respective bent portions 40b are inserted into the hole 42b of the clutch cover 42. Finally, the wire members 44 are fitted between the respective bent portion 40b and the clutch cover 42, and the temporary bolts removed.

In this clutch cover subassembly 8, in replacing the clutch disc subassembly 10, the clutch cover 42 is not damaged. For this reason, it is possible to re-use the clutch cover 42.

Furthermore, it is not necessary to use any permanent mounting bolts in fastening the clutch cover 42 to the arcuate engagement plates 40. Since no bolts are used, the radial dimension is not unduly enlarged. Furthermore, since all the operation may be performed from the transmission side, the replacement operation is generally simple. In particular, since the mounting and dismounting of the wire members 44 may be carried out in one operation, the operation efficiency is enhanced.

In the foregoing embodiment, the three arcuate engagement plates 40 form a cylindrical shape as a whole, but it is possible to use a single integral cylindrical member. One end of the cylindrical member may be fixed to the flywheel by fastening means such as press-fitting and welding. Further, in the above embodiment, three wire members 44 are employed to correspond with the engagement plates 40 (although only one wire member 44 is shown in FIG. 2). A single wire member 44 that extends just under 360° around the clutch assembly 1 may also be employed.

In the clutch assembly according to the present invention, simply by mounting or dismounting the limiting members between the ends of the bent portions and the disc-like clutch cover, it is possible to fasten or disassemble the disc-like clutch cover. Accordingly, bolts or the like may be dispensed with to thereby reduce the cost. Also, since all the operation may be performed from the transmission side, the operability is enhanced.

A second embodiment of the present invention will now be described with reference to FIGS. 3 and 4 of the accompanying drawings.

Figure 3:
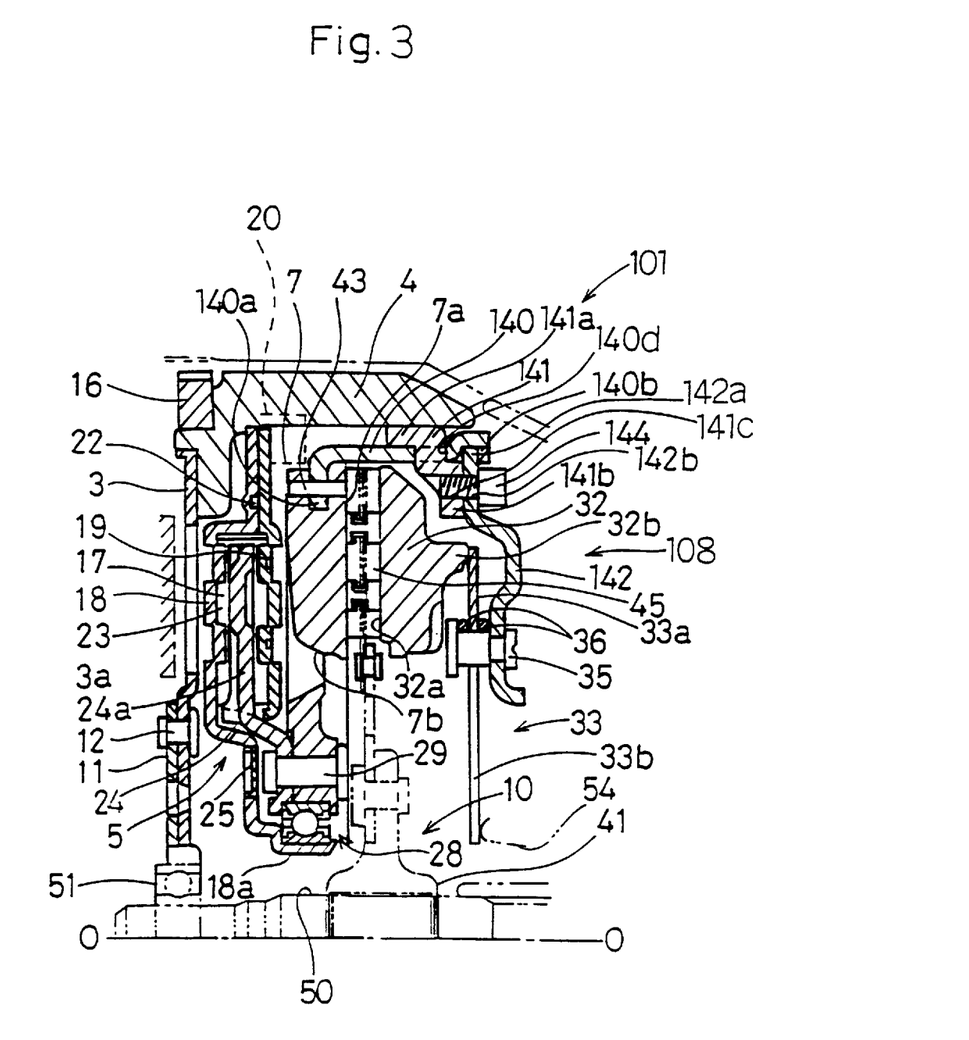
FIG. 3 is a fragmentary schematic cross-sectional view showing a clutch assembly in accordance with a second embodiment of the present invention.
Figure 4:
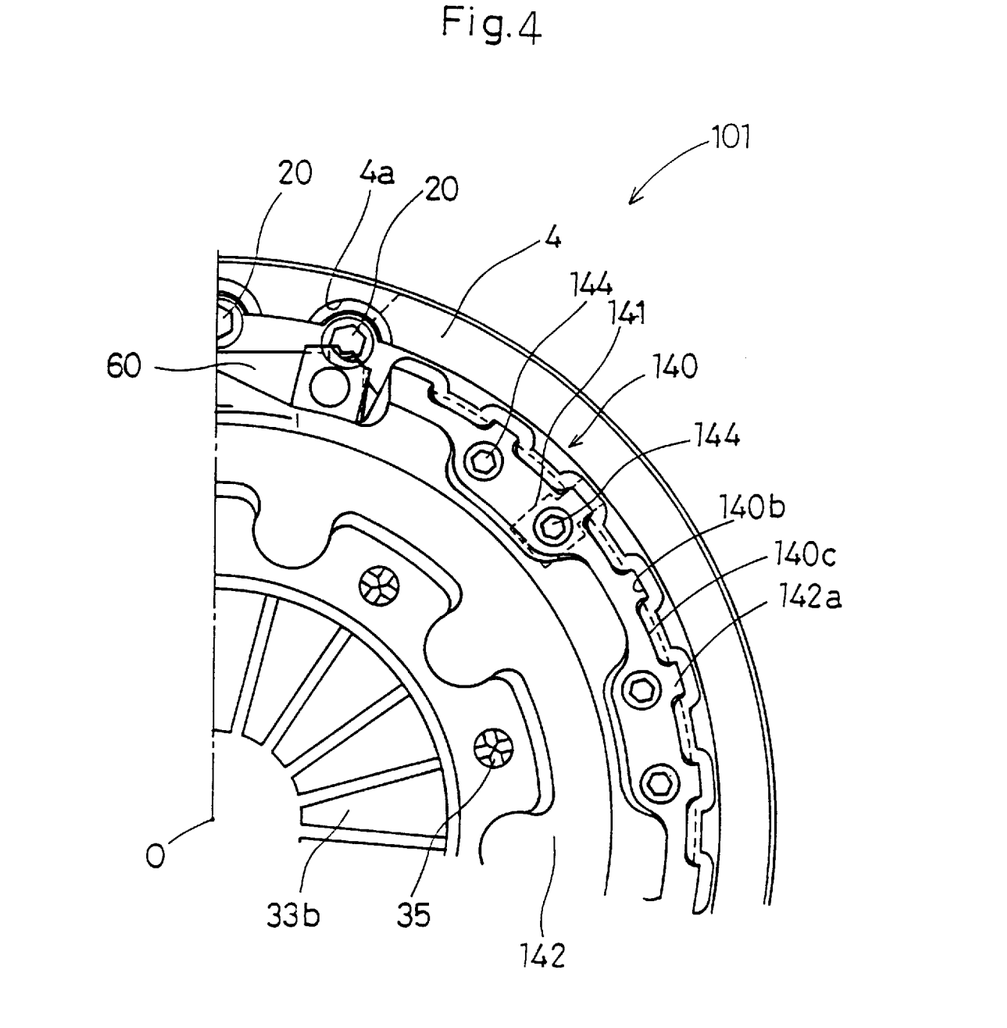
FIG. 4 is a fragmentary elevational view of the clutch assembly shown in FIG. 3.

A clutch assembly 101 shown in FIGS. 3 and 4 in accordance with a second embodiment of the present invention is mainly composed of a flexible plate 3, an inertia member 4, a viscous damper mechanism 5, a flywheel 7, and a clutch disc subassembly 10, all similar to the features described with respect to the first embodiment above. However, in the second embodiment a clutch cover subassembly 108 is employed, as described below.

The clutch cover subassembly 108 is mainly composed of arcuate engagement plates 140, a plurality of receiving members 141, a clutch cover 142, a pressure plate 32, bolts 144, stud pins 35, two wire rings 36 and a diaphragm spring 33.

Each arcuate engagement plate 140 has an arcuate shape and extends from the flywheel 7 toward the transmission. There are three arcuate engagement plates 140 provided at three positions about the pressure plate 32 defining a cylindrical shape as a whole. Each arcuate engagement plate 140 has, on the engine side, a fixture portion 140a extending into a groove formed in an outer circumferential surface of the flywheel 7. The fixture portion 140a is fixed to the flywheel 7 by a pin 43. As is apparent from FIG. 4, the end of the arcuate engagement plate 140 has a wavy or corrugated engagement portion which define alternating concave portions 140b and convex portions 140c. Also, a plurality of radially extending holes 140d are formed adjacent to some of the concave portions 140b of the corrugated engagement portion. Each receiving member 141 extends through a corresponding one of the holes 140d and are fixed thereto. Each receiving member 141 has a contact portion 141a in contact with the outer circumferential surface of the arcuate engagement plate 140. The contact portion 141a is slightly spaced apart from the inner circumferential surface of the inertia member 4. The receiving member 141 has a receiving seat 141b in which formed are threaded holes 141c. The receiving seat 141 is disposed inside of the arcuate engagement plate 140 and in contact with a surface of the outer circumferential portion of the clutch cover 142 on the engine side.

The clutch cover 142 is a disc-like plate member having a large diameter central hole in the center. The clutch cover 142 has a plurality of projecting portions 142a formed at spaced apart intervals in the circumferential direction. The projecting portions 142a are inserted from the transmission side into the concave portions 140b in the engagement with the arcuate engagement plate 140. By this engagement, the clutch cover 142 is kept non-rotatable with respect to the arcuate engagement plates 140. Also, bolt holes 142b are formed in positions corresponding to the threaded holes 141c of the receiving seat 141b. An end of each bolt 144 is threadedly engaged with the threaded hole 141c through the bolt hole 142b.

The clutch disc subassembly 10, pressure plate 32, diaphragm spring 33, stud pins 35, two wire rings 36 and strap plates 60 are generally as previously described with respect to the first embodiment, and therefore no further description is deemed necessary.

The operation of the clutch assembly 101 will now be described. When the crankshaft on the engine side is rotated, the torque is transmitted through the flexible plate 3 and the viscous damper mechanism 5 to the flywheel 7, further transmitted to the clutch disc subassembly 10 in the clutch engagement condition, and finally outputted from the main drive shaft 50.

In the case where the bent vibration is transmitted from the engine side, the flexible plate 3 may absorb the bending vibration while being warped in the bending direction.

In the case where the twist vibration is transmitted from the engine side, the first and second input plates 18 and 19 and the flywheel 7 take periodical relative rotation. In this case, the undulated leaf springs 23 are compressed in the circumferential direction, and the viscous fluid filled spaces between the undulated leaf springs 23 and the first and second input plates 18 and 19 within the spring receiving chamber 17 are compressed. Movement of viscous fluid within the chamber 17 creates further dampening characteristics. As a result, the viscous resistance is generated to thereby attenuate the twist vibration.

It should be appreciated that the fluid in the chamber 17 (of either embodiment) may be any of a variety of lubricants, such as oil based lubricants or dry lubricants.

Since the inertia member 4 is disposed at an outer circumferential portion of the clutch disk assembly 101, it is possible to reduce the overall axial dimensions of the structure of the first and second input plates 18 and 19 that constitute the spring receiving chamber 17. As a result, the clutch assembly as a whole may be made small in size in the axial direction. Furthermore, since the inertia member 4 extends longitudinally in the axial direction, the radial dimensions of the clutch assembly 101 as a whole are minimized. Further, even with the inertia member 4 is thus provided on the outer circumferential portion of the viscous damper mechanism 5, the assembly 101 has minimal dimensions in the radial direction due to omission of the bolt mounting seat typically employed in the prior art on the flywheel.

When the clutch assembly 101 is manufactured, the viscous damper mechanism 5, the flywheel 7 and the clutch cover subassembly 108 are assembled in advance prior to mounting them on to the flexible plate 3 and the inertia member 4. Now, the flywheel 7 and the clutch cover subassembly will be specifically explained. The arcuate engagement plate 140 is attached to the receiving member 141 in advance prior to being attached to the outer circumference of the flywheel 7. The clutch cover 142 and the pressure plate 32 are temporarily secured to one another in the axial direction by temporary fastening bolts (not shown). With the temporary fastening bolts in place, the clutch cover 142 and the pressure plates 32 are brought close to each other counteracting the biasing load from the diaphragm spring 33. Under this condition, the clutch cover 142, the pressure plate 32 and the diaphragm spring 33 are installed on the flywheel 7, and the projecting portions 142a of the clutch cover 42 are engaged with the concave portions 140b of the engagement portion of the arcuate engagement plate 140. Subsequently, the outer circumferential portion of the clutch cover 42 is fixed to the receiving portion 141 by the bolts 144. The temporary fastening bolts (not shown) are then removed. The pressure plate 32 and the clutch cover 42 are then biased in a direction away from each other by the diaphragm spring 33.

The mechanism composed of the viscous damper mechanism 5, the flywheel 7, the clutch cover subassembly 108 and the clutch disc subassembly is fixed to the flexible plate 3 and the inertia member 4 by a plurality of bolts 20. The bolts are caused to pass through a space in the circumferential direction of the arcuate engagement plates 140 and further through grooves 4a of the inertia member 4 for fastening the outer circumferential portions of the first and second input plates 18 and 19 to the inertia member 4. Thus, the bolts 20 are fastened from the transmission side, whereby the operability is more enhanced than that of the prior art. The reason for making it possible to fasten the bolts 20 from the transmission side is that the bolt mounting seat of the flywheel is dispensed with and the bolts 20 may be located more radially inwardly.

When the friction facing 45 of the clutch disc subassembly 10 is worn out, it is necessary to replace the clutch disc subassemblies 10. In this case, the bolts 20 are again operated, and the mechanism composed of the viscous damper 5, the flywheel 7, the clutch disc subassembly 10 and the clutch cover subassembly 108 is removed away from the flexible plate 3 and the inertia member 4. Subsequently, the clutch cover 42 and the pressure plate 32 are fastened by temporarily fastening bolts (not shown). Under this condition, the bolts 144 are removed, and subsequently, under the arcuate engagement plate 140 are flexed radially outwardly, the clutch cover subassembly 108 and the clutch disc subassembly 10 are drawn toward the transmission.

As described above, in the clutch cover subassembly, the clutch cover 42 is not damaged when the clutch disc subassembly 10 is replaced. For this reason, it is possible to reuse the clutch cover 42 that has been removed. Furthermore, when the clutch disc subassembly 10 is replaced, it is possible to remove the clutch cover 42 and the diaphragm spring 33 away from the flexible plate 7 only by operating bolts 144. Therefore, the operability is enhanced very much. Also, since the bolts 144 are not mounted on the outer circumference of the flywheel 7, the radial dimension of the clutch assembly 101 as a whole is minimized.

In the foregoing embodiment, the three arcuate engagement plate 140 forms a cylindrical shape as a whole but an integral or one piece cylindrical member may be used. One end of the cylindrical member is fixed to the flywheel by fastening means such as press-fitting and welding.

In the clutch assembly according to the present invention, since the limiting member is detachably provided on the engagement portion extending in a direction away from the flywheel, the operator may perform the mounting and dismounting operation of the clutch cover subassembly only by the operation to the clutch assembly from the side opposite the engine.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A clutch assembly comprising:

a flywheel having a friction surface formed thereon;

an engagement member engaged with an outer circumferential surface of said flywheel, said engagement member formed with at least one engagement portion extending in an axial direction away from said flywheel, said engagement portion formed at a distal end thereof with a bent portion which extends radially inwardly;

a disc-like clutch cover formed at an outer circumferential portion thereof with at least one hole through which said bent portion extends;

a pressure plate and diaphragm spring disposed within said disc-like clutch cover, said pressure plate formed with a friction surface confronting said friction surface of said flywheel and said diaphragm spring biasing said pressure plate toward engagement with said friction surface of said flywheel;

a limiting member disposed detachably between said bent portion and an outer surface of said disc-like clutch cover restraining said disc-like clutch cover from axial movement with respect to said engagement member; and a clutch disc disposed between said friction surface of said flywheel and said friction surface of said pressure plate;

wherein said engagement member comprises a plurality of arcuate members which together circumferentially encompass said flywheel, each of said arcuate members formed with at least one engagement portion, each engagement portion formed with said bent portion, and said disc-like clutch cover is formed with a plurality of said holes, one of each of said holes corresponding to each of said bent portions; and wherein said limiting member comprises at least one arcuate shaped wire member disposed between ends of adjacent ones of said bent portions and said disc-like clutch cover.

2. The clutch assembly according to claim 1, wherein said wire member is bent at each end thereof for engagement with a portion of a corresponding one of said bent portion.

3. The clutch assembly according to claim 1, wherein said disc-like clutch cover is formed with an outer circumferential edge which is bent to extend in an axial direction for engagement with an outer circumferential surface of said engagement portion.

4. The clutch assembly according to claim 1, wherein said flywheel is connected to a driven member which extends into a vibration damper mechanism, said vibration damper mechanism being configured to receive torque.

5. The clutch assembly according to claim 4, further comprising an annular inertia member fixed to said vibration damper mechanism for rotation therewith, said annular inertia member circumferentially surrounding said flywheel and said engagement member, said vibration damper mechanism configured to allow limited rotary displacement between said flywheel and said annular inertia member.

6. A clutch assembly comprising:

a flywheel having a friction surface formed thereon;

an engagement member engaged with an outer circumferential surface of said flywheel, said engagement member extending in an axial direction away from said flywheel, said engagement member formed with engagement portions formed at a distal end thereof;

a disc-like clutch cover formed at an outer circumferential portion thereof with a plurality of engaging extensions which extend radially outwardly from said disc-like clutch cover for engagement with said engagement portions;

a pressure plate and diaphragm spring disposed within said disc-like clutch cover, said pressure plate formed with a friction surface confronting said friction surface of said flywheel and said diaphragm spring biasing said pressure plate toward engagement with said friction surface of said flywheel;

a retaining member connecting said disc-like clutch cover to said engagement portion; and a clutch disc disposed between said friction surface of said flywheel and said friction surface of said pressure plate;

wherein said engagement portions are formed with a plurality of apertures and said retaining member comprises a plurality of retaining members, one of each of said retaining members extending through a corresponding one of said apertures, and a portion of each of said retaining members is bolted to said clutch cover.

7. The clutch assembly according to claim 6, wherein said engagement portions comprise a plurality of alternating convex and concave portions formed on said engagement member, configured to engage said engaging extensions.

8. The clutch assembly according to claim 6, wherein said engagement member is formed with a corrugated portion at an outer end thereof, and said disc-like clutch cover is formed at an outer edge thereof with a corresponding a corrugated portion configured to engage said corrugated portion of said engagement member.

9. The clutch assembly according to claim 6, wherein said flywheel is connected to a driven member which extends into a vibration damper mechanism, said vibration damper mechanism being configured to receive torque.

10. The clutch assembly according to claim 9, further comprising an annular inertia member fixed to said vibration damper mechanism for rotation therewith, said annular inertia member circumferentially surrounding said flywheel and said engagement member, said vibration damper mechanism configured to allow limited rotary displacement between said flywheel and said annular inertia member.

11. A clutch assembly comprising:

a flywheel having a friction surface formed thereon;

an engagement member engaged with an outer circumferential surface of said flywheel, said engagement member extending in an axial direction away from said flywheel, said engagement member formed with engagement portions formed at a distal end thereof;

a disc-like clutch cover formed at an outer circumferential portion thereof with a plurality of engaging extensions which extend radially outwardly from said disc-like clutch cover for engagement with said engagement portions;

a pressure plate and diaphragm spring disposed within said disc-like clutch cover, said pressure plate formed with a friction surface confronting said friction surface of said flywheel and said diaphragm spring biasing said pressure plate toward engagement with said friction surface of said flywheel;

a retaining member connecting said disc-like clutch cover to said engagement portion; and a clutch disc disposed between said friction surface of said flywheel and said friction surface of said pressure plate;

wherein said engagement member is formed with a corrugated portion at an outer end thereof, and said disc-like clutch cover is formed at an outer edge thereof with a corresponding a corrugated portion configured to engage said corrugated portion of said engagement member.

* * * * *